April 22, 1924.
N. H. FOOKS
1,491,093
HEAT TREATING SUBSTANCE PACKED IN SEALED RECEPTACLES
Filed Feb. 4, 1922
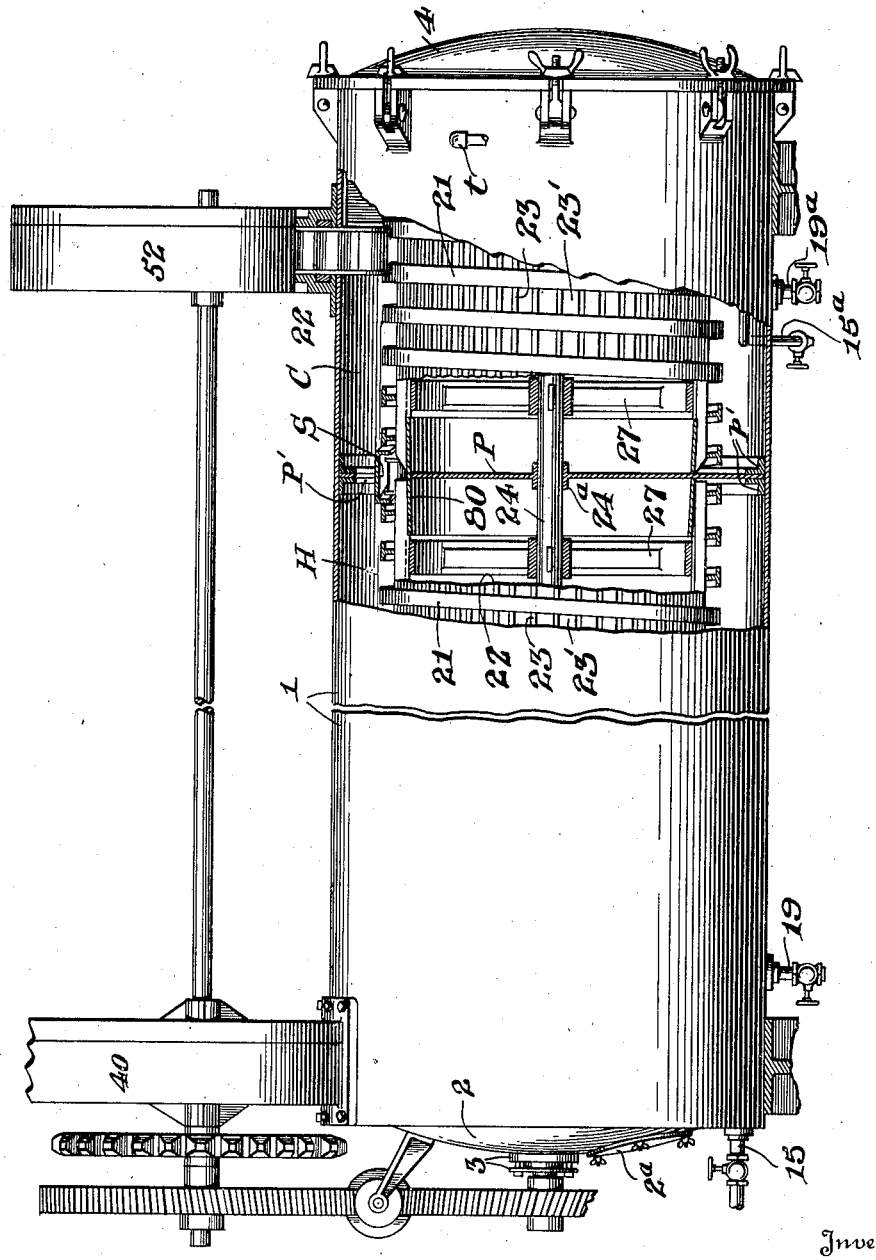
Inventor
Nelson H. Fooks
By Mason Fenwick & Lawrence
Attorneys Patented Apr. 22, 1924.

1,491,093

UNITED STATES PATENT OFFICE.

NELSON H. FOOKS, OF PRESTON, MARYLAND.

HEAT-TREATING SUBSTANCE PACKED IN SEALED RECEPTACLES.

Application filed February 4, 1922. Serial No. 534,237.

*To all whom it may concern:*

Be it known that I, NELSON H. FOOKS, a citizen of the United States, residing at Preston, in the county of Caroline and State of Maryland, have invented certain new and useful Improvements in Heat-Treating Substances Packed in Sealed Receptacles; and I do hereby declare the following to be a full, clear, and exact description of the invention, such as will enable others skilled in the art to which it appertains to make and use the same.

This invention relates to continuous processes of heat treating foods or other substances packed in sealed receptacles. It particularly appertains to continuous processes of cooking or sterilizing food in hermetically sealed receptacles, such as tin cans, under relatively high heat and pressures.

Its object is to enable sealed receptacles containing food to be subjected to heat higher than 212° Fahrenheit under pressure greater than normal atmospheric pressure and to be cooled under similar high pressure in a retort or like container by a continuous process, whereby the receptacles, when discharged into the outer atmosphere, will have had their contents adequately cooked or sterilized and the temperature so reduced before discharge from the retort that the internal pressure will not be sufficiently higher than that of the normal atmosphere to strain or rupture them when discharged into the external air.

The best heat transferring mediums for cooking and sterilizing purposes now known are liquids, or vapors that condense to liquid form at ordinary temperatures.

In my Patent No. 1,354,962, I have disclosed a method and apparatus for successively heating and cooling food or other substances packaged in sealed receptacles, by passing said receptacles in procession successively through a heating medium consisting of water or other suitable liquid raised to a temperature higher than its boiling point in the external atmosphere, but prevented from boiling by a fixed gas held under pressure over the water, and through a mass of cooling liquid held under the same pressure of the same body of gas until the receptacles are sufficiently cooled to avoid danger of straining or rupture when subjected after treatment to the reduced pressure of the external air. Should the conveying mechanism within a retort, in which water or other liquid is the cooking or heating medium, become choked or broken in operation, it would be necessary to drain off the water in order to obtain access to the interior of the retort for the purpose of removing the obstruction or making the necessary repair. It necessarily requires considerable time to drain out the superheated water and allow the chamber to cool sufficiently to permit men to work within it. By the use of my present process I am able to continuously heat a procession of receptacles containing food or the like by means of steam and also to secure the advantage, in case of obstruction of the conveying mechanism, of being able to quickly blow off the steam contained within the retort whereby little time is lost in making necessary repairs in case of such obstructions. In the apparatus that I use to carry out this process a body of cooling liquid, such as water, is maintained in one chamber of a retort and is held under pressure higher than atmospheric by a cooking medium consisting of steam filling another chamber and overlying the water by reason of an always open passageway between said chambers at the upper part of the retort.

In the accompanying drawings I have shown in side elevation, partly in section, one form of apparatus by which this process may be practiced.

For illustrative purposes the drawing discloses a retort or closed container comprising an outer cylindrical shell 1 closed at one end by a convex head 2 having a man-hole and cover 2ª and in the center thereof a stuffing box 3, through which extends a shaft 24 for the purpose of operating a reel or carrier for submerging and moving the cans or other receptacles in continuous procession through the treating fluids in the retort or container. The other end of the shell is closed by a head which may be a door 4 by which access may be had to the interior of that end of the retort. In the top of the shell are a plurality of ports preferably in horizontal alinement. One of the ports is at the left of the retort as indicated in the drawing and serves to admit cans or other objects into that end of the retort. The other or discharge port is indicated near the right of the drawing and is the port through which the cans or other objects are discharged from the retort. Over the ports are secured casings 40 and 52, respectively, each casing housing a rotary pocket valve or air-lock; that at the left being adapted to charge or feed the objects into the retort without materially reducing the pressure therein and that at the right being adapted to similarly discharge the treated objects. The charging and discharging means may be of the type illustrated and described in my prior United States Patent No. 1,363,103, patented December 21, 1920. The retort is divided into two chambers H and C by a transverse partition P which may be suitably insulated, if desired, and secured to the integral shell 1 by means of two annular angle bars $p'$ or by any other suitable means. The partition P does not completely separate the two chambers H and C but stops short of the top of the shell 1 in order to provide free communication through a passage P', always open, between the upper portions of said chambers to allow free movement of steam within the retort from one chamber to the other and admit of the passage of cans or other objects being treated from the chamber H to the chamber C. The chamber H is designed to be completely filled with steam under pressure and the chamber C is designed to receive a body of cooling liquid, such as water, into which the cans or other objects are introduced after the high heat treatment received by passing them through the steam in the chamber H, said steam overlying the body of cooling liquid and maintaining it under the same pressure as exists in the chamber H. In order to introduce the steam into the chamber H a pipe 15 may be led into the lower portion thereof it being designed that said pipe shall be connected to a steam boiler under sufficient pressure to force the steam into the retort and enable the desired high temperature to be attained. Pipe 15 may be controlled by a suitable hand valve, or otherwise. A drain pipe 19 may be provided for the purpose of draining off water of condensation.

Cooling water may be admitted into the chamber C by a pipe 15ª and may overflow therefrom through an outlet pipe $t$ which may be connected to a suitable trap. In order to force the water in against the pressure of steam held within the retort a force pump may be used or the water may be taken from a stand pipe of such elevation as will overcome the pressure within the retort. Thus, a constant circulation of water may be kept flowing through the chamber C in order to keep the temperature sufficiently low for the purposes in view. Chamber C may be emptied of water through pipe 19ª.

As an exemplary means for conveying the cans or other objects through the chambers H and C over the longest practicable path so that they may be subjected to a high temperature during a period long enough to cook or sterilize them thoroughly and a lower temperature long enough to cool them sufficiently to reduce the internal pressure to a safe point, helical guides 21 may be fixed within the shell 1 between the inlet valve and the partition P and between said partition and the outlet valve. A rotary rack 22, divided by said partition into two sections, each comprising two sets of longitudinal flights or guide ribs and each flight formed by a flange 23 of an angle iron, the other flange 23' of which constitutes a shelf for supporting the objects, is mounted within the turns of said helical guides 21 and concentric therewith. The helical guides 21 may be formed of T-section, metallic shapes bent into helical coils with the flanges on the convex side forming, as it were, single threaded screws, the inside of adjacent overlapping flanges of the T-irons constituting the tracks or surfaces on which the cans or other bodies are rolled or otherwise moved by the ribs 23 of the rotary rack. The said ribs are spaced apart a distance to receive cans or other objects between them and as said objects roll or move along the helix formed by the turns of the guides 21, they are also pushed by the latter longitudinally of the rack, always toward the discharge valve. The flights 23, 23' may be carried on the peripheries of wheels 27, which are keyed or otherwise secured to a shaft 24 projecting at one end through the bearing boss 3 in the center of the head 2 and through a suitable stuffing box. The other end of said shaft 24 may be journaled in a hanger on the inside of the retort adjacent the door 4 as shown in my prior United States Patent No. 1,363,103, patented December 21, 1920, or in any suitable manner. Between its ends said shaft 24 has bearing in a fluid-tight journal box 24ª in the partition P. The turns in the helical guides 21 in chambers H and C are so positioned with respect to the partition P that when a can has travelled through the heating chamber H to the partition it is in position to be shifted through the opening P' into the adjacent chamber C in order that it may be moved through the latter and through the cooling liquid therein. To shift the cans from one rack section to the other across the partition P it is necessary to move the cans endwise a distance equal to the space between two turns of the guides 21 within a distance of the helical course equal substantially to the circumferential extent of the opening P' in the partition. For this purpose a cam or crossover device S is fixed with respect to said guides 21. This crossover may be, as shown, a channel iron secured to said helical guide members and so constructed and arranged as to shunt the cans from the delivering end of the rack section in one chamber to the receiving end of the rack section in the other chamber, as disclosed in my prior Patent No. 1,402,488, patented January 3, 1922. In accordance with the disclosures of said patent a curved plate 80 may be provided in order to afford an unobstructed surface for the passage of cans from one rack to the other.

It will be understood that suitable provisions are made at the receiving end of the retort whereby the cans or the like to be treated may be delivered successively one by one from the inlet valve in casing 40 into the receiving end of the rack and within the starting end of the helical guideway and that suitable provisions are made at the delivery end of the rack whereby the cooled cans or the like may be removed from the retort by means of the discharge valve in the casing 52 at the delivery end, all as more fully described in the prior patents referred to herein.

In practice the chamber C should be charged with water to a suitable height determined by the height of the outflow pipe *t*. Steam should be forced in through the pipe 15 until the required pressure is reached within the retort. Steam may be admitted from a boiler where the gage indicates a pressure of, say eighty pounds, until a temperature of, say 240°. Fahrenheit, is indicated within the retort, when there will be a gage pressure of about 15 pounds within the retort. There is then within the retort a body of live steam under pressure overlying the cooling water in the chamber C.

The passageway between the two chambers H and C being always open, there will be the same pressure in the chamber C as in the chamber H. The water may be kept at a sufficiently low temperature by continually forcing it into, through and out of the chamber C. As there is no valve separating the chambers, objects may be passed from the heating chamber to the cooling chamber with facility while exactly the same pressure may be held in both chambers at all times. The absence of a valve between the chambers simplifies the structure, eliminating a piece of mechanism that is likely to get out of order and obstruct the operation of the conveying mechanism. Objects may be fed into one end of the chamber H in succession, submerged in and moved in procession through the body of steam whereby the contents of the cans are hightly heated and cooked and then transferred into the body of cooling water in the cooling chamber, subjected to the cooling action thereof until the internal pressure is sufficiently reduced and then passed through the discharge valve into the external atmosphere,—as a continuous operation.

The volume of steam overlying the water is relatively small compared with the volume of water. Cool water can be kept constantly flowing through the cooling chamber and as the partition P may be insulated the cooling water may be kept at a sufficiently low temperature to reduce the pressure within the cans to a sufficient degree so that when the cans are removed into the exterior atmosphere there is not sufficient excess of pressure within the cans over that of the atmosphere to strain or rupture them.

Having described my invention what I claim and desire to secure by Letters Patent is:

1. A continuous process of heat treating alimentary substances in sealed receptacles which consists in maintaining within a chamber, under pressure higher than that of the atmosphere surrounding said chamber, a body of steam overlying a body of cooling liquid; introducing receptacles successively into the chamber, subjecting them continuously to the heat of the steam until the contents are cooked or sterilized, then subjecting them continuously to the action of the liquid in said chamber until they are sufficiently cooled, and successively removing said receptacles from the chamber,— all as a continuous operation.

2. A continuous process of heat treating alimentary substances in sealed receptacles which consists in maintaining, within a retort or like container, under pressure higher than that of the atmosphere surrounding the retort, a body of steam overlying a body of relatively cool water flowing through said retort; introducing receptacles successively into the retort, submerging them in the steam until their contents are cooked or sterilized, then subjecting them to the action of the flowing water until their heat and internal pressure are sufficiently reduced, and then removing them successively from the retort,—all as a continuous operation.

3. A continuous process of heat treating alimentary substances in sealed receptacles within a retort or like container divided into chambers having an always open passageway between them, said process consisting in maintaining a body of cooling liquid in one chamber and a body of steam overlying said liquid and filling the remainder of the space in both chambers and maintaining said steam under pressure higher than that of the atmosphere surrounding the retort; introducing receptacles successively into the container, submerging them in and moving them through the steam and then through the passageway into and through the cooling liquid and out of the retort in succession,—all as a continuous operation.

4. A continuous process of heat treating alimentary substances in sealed receptacles within a retort or like container divided into chambers having an always open passageway between them, said process consisting in causing a body of water to flow through one chamber while kept at a constant depth therein, maintaining a body of steam overlying said water and filling the remainder of the space in both chambers and holding the steam under pressure higher than that of the atmosphere surrounding the retort; introducing receptacles successively into the container, submerging them in and moving them through the steam until their contents are cooked or sterilized, and then through the passageway into and through the cooling liquid and out of the retort in succession,—all as a continuous operation.

In testimony whereof I affix my signature.

NELSON H. FOOKS.